United States Patent

Godfrey

[15] 3,636,881
[45] Jan. 25, 1972

[54] GAS-GENERATING CHARGE

[72] Inventor: John N. Godfrey, Asheville, N.C.
[73] Assignee: The Susquehanna Corporation
[22] Filed: July 25, 1966
[21] Appl. No.: 567,512

[52] U.S. Cl. .............................................. 102/103, 181/87
[51] Int. Cl. ..................................................... F42b 1/00
[58] Field of Search ............... 149/47, 76, 2, 19, 83; 102/24, 102/38, 39, 98, 102, 103, DIG. 8; 161/205, 231, 88, 89, 87; 86/1

[56] References Cited

UNITED STATES PATENTS

| | | | |
|---|---|---|---|
| 3,263,613 | 8/1966 | Rice et al. | 102/103 |
| 3,203,842 | 8/1965 | Godfrey | 149/19 |
| 3,046,829 | 7/1962 | Roemer | 149/47 X |
| 3,002,830 | 10/1961 | Barr | 149/83 X |

Primary Examiner—Robert F. Stahl
Attorney—Martha L. Ross

[57] ABSTRACT

A shaped gas-generating charge comprising a solid, substantially oxidizer self-sufficient, gas-generating grain and a combustion-restricting polymeric inhibitor containing a woven reinforcement and a vaporizable material to cool the polymeric inhibitor and to retard the decomposition of the inhibitor polymer to prevent the introduction of inhibitor decomposition products into the generated gas stream. Vaporizable material is present in the inhibitor in a concentration of from about 10 to about 50 percent by weight based on the total weight of the polymer and vaporizable material in the inhibitor.

4 Claims, 2 Drawing Figures

PATENTED JAN 25 1972 3,636,881

INVENTOR

JOHN N GODFREY

BY Thomas N. Wallin

ATTORNEY

GAS-GENERATING CHARGE

BACKGROUND OF THE INVENTION

This invention relates to shaped, gas-generating charges having novel inhibitor coatings. More particularly, the invention relates to gas-generating charges having inhibitors which resist physical and chemical degradation, thereby minimizing introduction of solids into the gases produced by burning of the shaped charge.

The use of gas-generating charges to produce gases for a variety of purposes is well known. An important factor controlling the rate at which such charges yield gas is the area of the burning surface of the gas-generating grain. Burning surface area is commonly controlled by restricting the burning of the grain to a predetermined surface or surfaces by coating other surfaces with an inhibitor. In order to function effectively, such inhibitor coatings must adhere continuously and tenaciously to the grain. Similarly, the inhibitor coating must be free from and resist formation of cracks or fissures which would permit ignition at undesired points. Otherwise, dangerous pressure increases can result from ignition at grain surfaces exposed by inhibitor failure or separation from the grain.

If the charge is to be used in devices wherein the gas generated is passed through valves, supply lines, or other small openings, the inhibitor coating must meet an additional requirement. The inhibitor must not contaminate the gas with solids capable of clogging such openings. Such uses of gas-generating charges have hitherto been limited since conventional inhibitors, when exposed to combustion chamber temperatures, pressures, and gas flows, chemically and physically deteriorate to introduce carbonaceous residues and other solids into the gas stream. Even in apparatus where there is no danger of obturation of small openings, solid particles entrained in high-velocity gas streams severely abrade surfaces contacted by the gas stream. Thus, the desirability of inhibitors which do not contribute undue amounts of solids, is readily apparent.

Accordingly, it is an object of this invention to provide gas-generating charges having improved inhibitors which effectively restrict burning to desired surfaces and resist structural and chemical degradation thereby minimizing introduction of solids into the gas generated.

Other objects and advantages will be evident from the following description and drawings.

Figure 1:
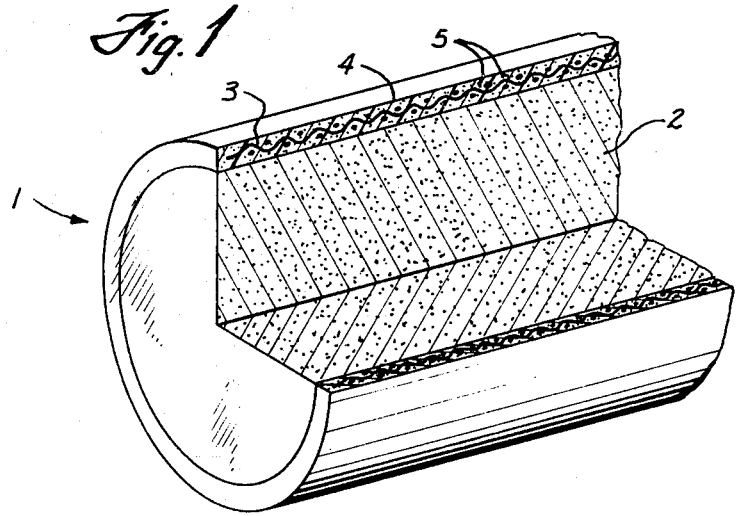
FIG. 1 is a view, partly in section, showing an end-burning, gas-generating charge provided with the novel inhibitor of this invention.
Figure 2:
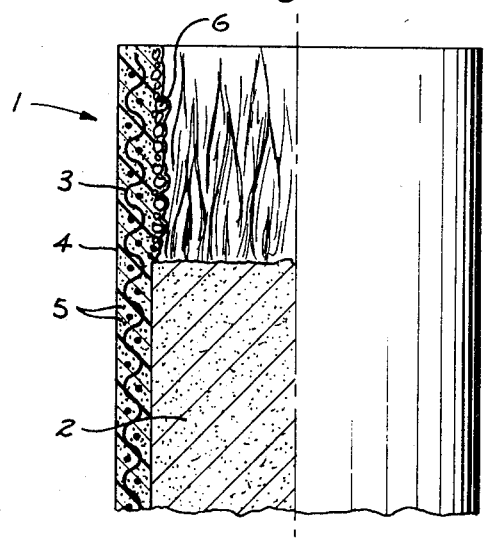
FIG. 2 is a view, partly in section, of an inhibited charge which schematically illustrates the behavior of the inhibitor during the burning of the charge.

The inhibitor of this invention, as shown in FIG. 1, comprises a woven inorganic reinforcement 3, impregnated with a thermoplastic polymer 4, in which particles of solid vaporizable coolant 5, are dispersed. The inhibitor 1, is intimately bonded to a shaped, gas-generating grain 2. Referring to FIG. 2, it is seen that the heat of combustion of the grain vaporizes the coolant particles within the polymer to cool the inhibitor and to form an insulating layer of bubbles 6. This combined cooling and insulating effect minimizes decomposition of the impregnant. The impregnant protects the woven inorganic reinforcement from breakage and erosion. The reinforcement, in turn, provides structural strength, serves as a heat sink to further retard polymer decomposition, and serves as a framework which retains solid inhibitor decomposition products, such as charred polymer, and prevents introduction of such products into the gas stream. Thus the advantages provided by the inhibitor result from cooperative interaction of all the inhibitor components.

The woven inorganic reinforcement is selected from materials capable of providing structural support and, when protected by the impregnant, withstanding the temperatures present in the combustion chamber. It is essential that the reinforcement be in the form of woven cloth in order to provide the inhibitor with structural reinforcement and to prevent contamination of the gas stream. Powder, scrim, and individual filaments can be entrained in the gas stream and are not acceptable. Examples of suitable reinforcements include woven asbestos, glass, and carbon cloth. Asbestos is particularly preferred in view of its resistance to high temperatures, ready availability and low cost. Therefore, for simplicity, this invention will hereinafter be described in terms of embodiments utilizing woven asbestos cloth as the inorganic reinforcement.

The impregnant for the asbestos cloth comprises particulate coolant dispersed in a polymer.

The coolant is selected from materials which vaporize either by volatilization or decomposition at temperatures equal to or lower than the flame temperature of the grain. Examples of the numerous organic and inorganic coolants which may be utilized include ammonium phosphate, ammonium oxyalate, sodium bicarbonate, oxamide, melamine, urea, and the like. Mixtures of such coolants may, of course, be utilized. Monobasic or dibasic ammonium phosphate are particularly preferred coolants in view of their well-known flameproofing properties.

About 10–50 percent by weight of coolant must be present in the impregnant. The minimum amount to be used is governed by the vaporization characteristics of the particular coolant, the nature of the polymer, and the grain utilized in the gas-generating charge. However, it has been found that coolant concentrations below about 10 percent do not generally provide improved results. At least two considerations preclude the use of coolant concentrations above about 50 percent. Firstly, higher solids concentrations tend to physically weaken the inhibitor, thus increasing the likelihood of mechanical failure. Secondly, the excess gas-evolution resulting from higher concentrations causes rapid bursting of insulating bubbles and even disintegration of the inhibitor.

The polymer utilized in the inhibitor is chosen primarily for its ability to form an intimate bond with the grain, either directly or by means of a suitable adhesive. Therefore, in many instances, the polymer used as a binder in the gas-generating grain is an excellent choice for use in the inhibitor. The polymer must be thermoplastic in order to permit satisfactory formation of insulating bubble layers. The polymer can be a hydrocarbon or can contain oxygen or halogen which is linked to a carbon, silicon, sulfur or phosphorous atom, and is therefore not available to any appreciable extent for further oxidation of the molecule. The use of such oxygen or halogen containing polymers is, in fact, particularly preferred since thermal degradation of such polymers yields gaseous oxides or halides which augment the formation of insulating bubble layers in the inhibitor. Furthermore, decomposition of such polymers generally results in the formation of lower percentages of solid carbonaceous residues than are commonly obtained from unoxygenated or unhalogenated polymers. Oxygenated polymers are preferred over halogenated polymers since the decomposition products of the halo polymers are often quite corrosive.

Examples of suitable polymers include epoxy and epoxy-polyamide resins; polysulfide resins; butadiene resins and butadiene-acrylic acid and butadiene-methyl vinyl pyridene copolymers; polyolefins; polyurethanes; cellulose esters such as cellulose acetate; halogenated polymers such as polytetrofluoroethylene, polyvinyl chloride; and copolymers of vinylidene fluoride and perfluoropropylene; and polyester resins. Carboxyl terminated saturated polyester resins having an average of between two and three carboxyl groups per molecule are particularly preferred. Such polyesters include reaction products of an acid component such as saturated polycarboxylic acid, its anhydride, or mixtures thereof and a mixture of a saturated dihydric alcohol such as a glycol and a saturated polyhydric alcohol having at least three hydroxyl groups such as pentaerythritol or glycerol. The polyesters are advantageously cured by means of di- and trifunctional imine or di- and trifunctional epoxy compounds which react with the polyester carboxyl groups to form a suitable cross-linked polymer. Polyesters of this type are strong, form minimal amounts of solids upon decomposition, and strongly adhere to a variety of gas-generating grains.

The shaped-solid grains used in the gas-generating charges of this invention are substantially self-contained with respect to their oxidizer requirements. Compositions which generate gases relatively free of solids are preferred. For example, compositions such as described in U.S. Pat. No. 3,203,842, yield extremely small quantities of solids when burned. These compositions comprise, by weight, between about 10–30 percent ammonium perchlorate and between about 60–40 percent ammonium nitrate, the total oxidizer mix constituting about 60–70 percent of the composition; and a cured, substantially linear saturated polyester resin binder having an average of between about two and about three carboxyl groups per molecule. The polyester is the reaction product of saturated aliphatic polycarboxylic acid, its anhydride or mixtures of these components and a mixture of saturated dihydric alcohol and saturated polyhydric alcohol having at least three reactive hydroxyl groups. The choice of a particular grain composition will generally be determined from consideration of the chemical composition of the generated combustion products and its physical properties. The grains are prepared by conventional casting, molding or extrusion processes.

A variety of well-known processing techniques are readily adaptable to the fabrication of the inhibited gas-generating charges of this invention. For example, the grain can be coated with uncured polymer impregnant. The asbestos fabric is then applied over the polymer coating with sufficient pressure to cause the polymer to penetrate through to the exterior surface of the fabric. The expressed polymer is then spread smoothly over the exterior surface of the fabric. Alternatively, the asbestos cloth can be dipped in the impregnant and then applied to the grain surface. One or a plurality of inhibiting layers can be formed prior to curing the polymer. In practicing such techniques, the asbestos cloth is precut to the size of the grain surface to be covered or is applied in the form of a tape which is wound onto the grain as desired.

In another conventional process, the charges are fabricated by casting the combustible composition into the preformed inhibitor and thereafter curing the composition. The interior surface of the inhibitor can be roughened or coated with various bonding agents to promote the formation of a strong, intimate bond between the inhibitor and the grain.

The following example is illustrative of the practice of this invention:

EXAMPLE 1

Woven asbestos cloth was impregnated with the following composition:

| Ingredient | Percent by weight |
| --- | --- |
| Saturated polyester resin (Reaction product of adipic acid, diethylene glycol, and glycerol having an average of about 2.5 carboxyl groups per molecule) | 54.8 |
| Trifunctional epoxy curing agent: $\left(\underset{CH_2\!-\!\!-\!\!CH\!-\!CH_2}{\overset{O}{\diagup\!\!\diagdown}}\right)_2\!\!-\!N\!-\!\!\langle\!\!\!\diagup\!\!\!\diagdown\!\!\!\rangle\!-\!O\!-\!CH_2\!-\!\overset{O}{\overset{\diagup\diagdown}{CH\!-\!\!-\!\!CH_2}}$ | 18.2 |
| Dibasic ammonium phosphate | 27 |

The impregnated cloth was formed into a cylindrical boot by wrapping it around a mandrel and curing the polyester at about 160° F. The finished boot weighed about 335 g. The boot was filled with about 1,300 grams of the following gas-generating composition:

| Ingredient | Percent by weight |
| --- | --- |
| Ammonium nitrate | 45.5 |
| Ammonium perchlorate | 21.0 |
| Saturated polyester resin (Reaction product of adipic acid, diethylene glycol, and glycerol having an average of about 2.5 carboxyl groups per molecule) | 25.12 |
| Trifunctional epoxy curing agent | 8.17 |
| Wetting agent: $HO(CH_2CH\overset{\underset{\|}{H}}{N}CH_2(H_2O)_6H$ | .20 |
| Carbon black | .01 |

The composition was cured at 160° F. to form the final inhibited gas-generating charge.

The charge was burned in a combustion chamber fitted with a filter apparatus designed to collect solid particles entrained in the generated gas. Less than 5 grams of solid residue was found in the filter after burning the charge. The inhibitor was still intact and remained strong and flexible.

This invention has been described by reference to specific embodiments. It will be apparent that various modifications to such embodiments can be carried out without departing from the spirit and scope of the invention.

I claim:

1. In a shaped gas-generating charge comprising a solid oxidizer self-sufficient, gas-generating grain and an inhibitor in intimate, gas-sealing contact with selected surfaces of said grain, the improvement for providing substantially particle-free generated gas comprising, in combination, said inhibitor being formed from thermoplastic polymer and surrounding completely 1. a woven inorganic reinforcement extending substantially uniformly throughout said polymer, and
   2. a coolant vaporizable at a temperature at least as low as the combustion temperature of said grain dispersed substantially uniformly in said polymer, said woven inorganic reinforcement having space between adjacent threads to provide a framework to retain inhibitor decomposition products within said reinforcement, and said coolant being present in a concentration of from about 10 percent to about 50 percent by weight based upon the total weight of said polymer and said coolant, said concentration being sufficient to expand and cool the inhibitor polymer but less than necessary to cause the expanded polymer to burst and form particulate matter in the generated gas stream.

2. The article of claim 1 further characterized by said coolant being a particulate solid.

3. The article of claim 2 further characterized by said particulate solid being ammonium phosphate.

4. The article of claim 1 further characterized by said woven inorganic reinforcement being woven asbestos fabric.

* * * * *